A. B. VANDEMARK.
Car Starter and Brake.
No. 86,885.
Patented Feb. 9, 1869.
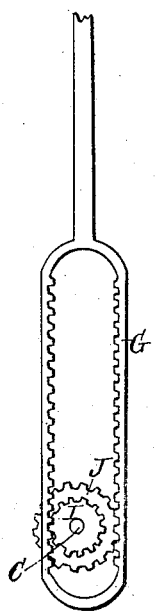
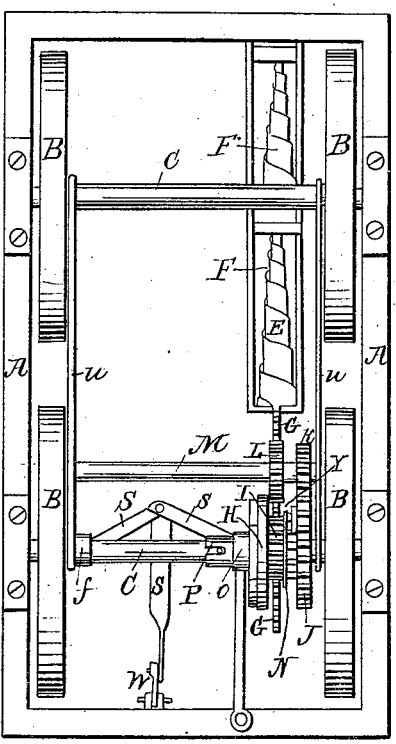
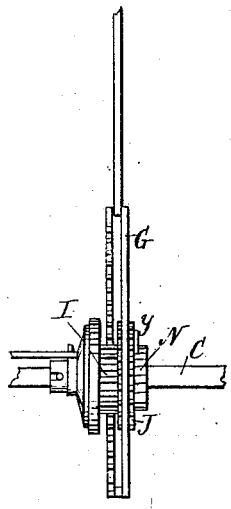
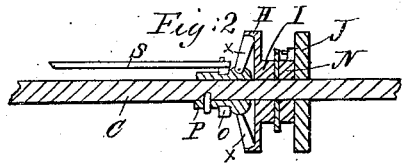

UNITED STATES PATENT OFFICE.

A. B. VANDEMARK, OF PHELPS, NEW YORK.

IMPROVED CAR BRAKE AND STARTER.

Specification forming part of Letters Patent No. 86,885, dated February 9, 1869.

*To all whom it may concern:*

Be it known that I, A. B. VANDEMARK, of Phelps, in the county of Ontario and State of New York, have invented a new and Improved Street-Car Brake; and I do hereby declare the following to be a clear and exact description of the nature thereof, sufficient to enable others skilled in the art to which my invention appertains to fully understand and use the same, reference being had to the accompanying drawings, making part of this specification, in which—

Figure 1 is a bottom view of a car with my improvement attached. Fig. 2 is a transverse section of a portion of the axle and of the parts applied thereto. Figs. 3 and 4 are modifications to be hereinafter referred to.

My invention relates to an improvement in the construction of a street-car brake and starter, and is designed to retain the power used in stopping to start or assist in starting.

It consists of an improved combination and arrangement of a spring, friction-clutch, toothed wheels, ratchet, and operating-levers, as will be hereinafter more fully described.

In the drawings, A represents the truck, B the wheels, and C the axles, of a car, which parts are of ordinary form and construction. On one of the axles I place collars t o, to which are connected braces S, pivoted to the operating-lever W.

A clutch of ordinary form is mounted on the axle, and has lateral sliding motion, but is caused to rotate with the axle by means of a pin secured to the axle and a slot in the collar of the clutch, or in any other well-known manner.

H is a friction cap or case, which is secured to a toothed wheel, I, and both are mounted loosely on the axle, but are adapted to revolve with the same through the medium of the clutch.

A rack bar or shaft, G, is so arranged as to engage with the toothed wheel I, and has its free end connected to a spring, E, which may be volute, coiled, or otherwise, and be inclosed in a case, or exposed, as desired or found necessary.

L and K are toothed wheels, which are mounted on a shaft, M, which should be so arranged that the wheel L will engage with the rack-bar G and the wheel K with a wheel, J, fitted loosely on the axle. This wheel J is placed aside of a smaller wheel, N, which is firmly secured to the axle.

A pawl, y, is hung to the wheel K, and drops over the wheel N, and has a use to be hereinafterward described.

The operation is as follows: The forward motion of the car rotates the axle, carrying with it the clutch and the ratchet-wheel N. When it is desired to stop the car the lever W is suitably operated, thereby giving motion to the braces S and causing the clutch to engage with the friction-cap H, and rotating said cap and the wheel I. This wheel, meshing with the teeth of the bar G, draws it forward and expands the spring E. The resistance of the spring at once tends to retard the motion of the car, and increases as the bar is drawn out until the power is sufficient to stop the car. When the hand-lever is reversed the clutch is released, which allows the wheel I to remain loose on the axle. The power of the spring acts upon the wheel J, forcing it forward. The pawl y, engaging with the teeth of the ratchet-wheel N, causes the axle to revolve and sets the car in motion.

The size of the wheel J is so proportioned to wheel I that the action of the power required to stop the car, when applied to wheel I, is sufficiently increased when applied to J to start or assist in starting, as desired.

In easing the car down hill the impeding power is regulated by the amount of force applied to the hand-lever, permitting the wheels to roll by allowing the clutch to slide in the friction-case.

If required to stop when ascending a hill, the power is acquired to assist in starting by backing the car, the axle operating on the spring by the connection of the ratchet and wheel J.

Figs. 3 and 4 are modifications of my invention. In this case the wheels L and K and shaft M are dispensed with.

I employ a double rack-bar to operate wheels I and J.

Having thus described my invention, what I claim as new, and desire to secure by Letters Patent, is—

The combination of the clutch, friction-case H, wheels I J, ratchet N, pawl y, wheels K L, rack-bar G, and spring E, substantially as and for the purpose described.

A. B. VANDEMARK.

Witnesses:
HIRAM H. FRASER,
LUCIUS L. HOWE.